United States Patent [19]
Simon et al.

[11] Patent Number: 5,632,072
[45] Date of Patent: May 27, 1997

[54] METHOD FOR HYDROPATTERNING NAPPED FABRIC

[75] Inventors: Arlene T. Simon, Boston; J. Michael Greenway, Westwood, both of Mass.; Herschel Sternlieb, Brunswick, Me.; Jodie M. Siegel, Sommerville; Timothy J. Connolly, Franklin, both of Mass.; Duane A. Parker, Samers, Conn.

[73] Assignee: International Paper Company, Purchase, N.Y.

[21] Appl. No.: 381,282

[22] Filed: Jan. 5, 1995

Related U.S. Application Data

[63] Continuation of Ser. No. 190,765, Feb. 2, 1994, abandoned, which is a continuation of Ser. No. 660,753, Feb. 25, 1991, abandoned, which is a continuation-in-part of Ser. No. 411,491, Jul. 17, 1989, Pat. No. 4,995,151, which is a continuation-in-part of Ser. No. 181,284, Apr. 14, 1988, Pat. No. 4,960,630.

[51] Int. Cl.$^6$ .............................. D06B 5/08; D06C 23/00
[52] U.S. Cl. .............................. 26/69 R; 28/162; 28/163; 28/167
[58] Field of Search .............................. 26/30, 69 R, 29 R; 28/105, 160, 162, 104, 103, 163, 167; 428/131

[56] References Cited

U.S. PATENT DOCUMENTS

| Re. 31,601 | 6/1984 | Ikeda et al. | 428/93 |
|---|---|---|---|
| 2,241,222 | 5/1941 | Sonnino | 26/2 |
| 2,862,251 | 12/1958 | Kalwaites | 19/161 |
| 2,981,999 | 5/1961 | Russel | 28/1 |
| 3,010,179 | 11/1961 | Thal | 28/72 |
| 3,033,721 | 5/1962 | Kalwaites | 28/105 |
| 3,081,515 | 3/1963 | Griswold et al. | 28/78 |
| 3,088,859 | 5/1963 | Smith | 28/106 X |
| 3,113,349 | 12/1963 | Nottebohm et al. | 19/161 |
| 3,157,633 | 11/1964 | Khun et al. | 260/200 |
| 3,214,819 | 11/1965 | Guerin | 28/72.2 |
| 3,256,581 | 6/1966 | Thal et al. | |
| 3,333,315 | 8/1967 | Dyer et al. | 28/72.2 |
| 3,403,862 | 10/1968 | Dworjanyn | 239/566 |
| 3,422,510 | 1/1969 | Livingston et al. | 28/1 |
| 3,434,188 | 3/1969 | Summers | 28/72.2 |

(List continued on next page.)

FOREIGN PATENT DOCUMENTS

| 287821 | 12/1988 | Australia. | |
| 739652 | 8/1966 | Canada. | |
| 4386/85 | 3/1986 | Denmark. | |
| 0215684 | of 0000 | European Pat. Off.. | |
| 0099639 | 2/1984 | European Pat. Off.. | |
| 0177277 | 9/1986 | European Pat. Off.. | |
| 0210777 | 2/1987 | European Pat. Off.. | |
| 0228197 | 7/1987 | European Pat. Off.. | |
| 228197 | 7/1987 | European Pat. Off. | 28/160 |
| 853707 | 3/1986 | Finland. | |

(List continued on next page.)

OTHER PUBLICATIONS

Kenneth R. Randall, "Hydroentanglement Technology for Wet-Laid Applications", *Nonwovens World*, pp. 28–31, Mar., 1989.

*Primary Examiner*—Amy B. Vanatta
*Attorney, Agent, or Firm*—Ostrager, Chong & Flaherty

[57] ABSTRACT

An hydropatterning apparatus conveys a sheet of fabric through a patterning station along a machine direction on a conveyor, preferably a drum, having a support surface formed with a pattern of raised or solid areas and lowered or void areas, and has one or more manifolds of hydrojet nozzles disposed above the conveyor for directing a continuous curtain of fluid downwardly to impact on the fabric so that properties of the fabric become altered in correspondence to the pattern of the support surface. The hydropatterning technique is used to emboss the screen pattern into the nap of napped fabric in order to produce aesthetically pleasing surface textures and patterns in the napped fabric, such as a fur-like surface texture. The technique can also be used for displacement of yarn or fiber to obtain three-dimensional effects such as ribbing, wavy lines, checkering, geometric or floral designs, or lacework.

4 Claims, 14 Drawing Sheets

U.S. PATENT DOCUMENTS

| | | | |
|---|---|---|---|
| 3,443,878 | 5/1969 | Weber et al. | |
| 3,458,905 | 8/1969 | Dodson, Jr. et al. | 19/161 |
| 3,485,706 | 12/1969 | Evans | 161/72 |
| 3,485,708 | 12/1969 | Ballou et al. | 28/105 |
| 3,485,709 | 12/1969 | Evans et al. | 161/109 |
| 3,486,168 | 12/1969 | Evans et al. | 161/169 |
| 3,493,462 | 2/1970 | Bunting, Jr. et al. | 161/169 |
| 3,494,821 | 2/1970 | Evans | 161/169 |
| 3,498,874 | 3/1970 | Evans et al. | 161/109 |
| 3,508,308 | 4/1970 | Bunting, Jr. et al. | 28/72.2 |
| 3,523,346 | 8/1970 | Bolen et al. | 26/28 |
| 3,531,363 | 9/1970 | Shambeian | 161/72 |
| 3,537,945 | 11/1970 | Summers | 428/292 X |
| 3,542,632 | 11/1970 | Eickhoff | 161/65 |
| 3,546,755 | 12/1970 | Lynch | 28/72.2 |
| 3,560,326 | 2/1971 | Bunting, Jr. et al. | 161/169 |
| 3,574,106 | 4/1971 | Bragg | 428/91 |
| 3,613,186 | 10/1971 | Mazzone et al. | 26/69 R |
| 3,616,175 | 10/1971 | Jung | 161/164 |
| 3,620,903 | 11/1971 | Bunting, Jr. et al. | 161/169 |
| 3,635,625 | 1/1972 | Voss | 425/135 |
| 3,681,182 | 8/1972 | Kalwaites | 28/105 |
| 3,682,756 | 8/1972 | Kalwaites | 28/105 |
| 3,688,355 | 9/1972 | Okzaki et al. | 28/1.4 |
| 3,707,746 | 1/1973 | Summers | 28/72.2 |
| 3,747,161 | 7/1973 | Kalwaites | 19/161 |
| 3,750,236 | 8/1973 | Kalwaites | |
| 3,750,237 | 8/1973 | Kalwaites | 19/161 P |
| 3,768,121 | 10/1973 | Kalwaites | 19/161 P |
| 3,769,659 | 11/1973 | Kalwaites | 19/161 P |
| 3,787,932 | 1/1974 | Kalwaites | 19/161 P |
| 3,800,364 | 4/1974 | Kalwaites | 19/161 P |
| 3,837,046 | 9/1974 | Kalwaites | 19/161 P |
| 3,873,255 | 3/1975 | Kalwaites | 425/83 |
| 3,906,130 | 9/1975 | Tsurumi et al. | |
| 3,917,785 | 11/1975 | Kalwaites | 264/108 |
| 3,960,485 | 6/1976 | Fantl et al. | |
| 3,967,470 | 7/1976 | Miura et al. | |
| 4,023,526 | 5/1977 | Ashus et al. | |
| 4,024,612 | 5/1977 | Contractor et al. | 28/72.2 F |
| 4,069,563 | 1/1978 | Contractor et al. | 28/105 |
| 4,085,485 | 4/1978 | Brandon et al. | 28/104 |
| 4,099,913 | 7/1978 | Walter et al. | |
| 4,109,353 | 8/1978 | Mitchell et al. | |
| 4,124,428 | 11/1978 | Forest | |
| 4,144,370 | 3/1979 | Boulton | 428/233 |
| 4,145,468 | 3/1979 | Mizoguchi et al. | 428/239 |
| 4,146,663 | 3/1979 | Ikeda et al. | 428/96 |
| 4,152,480 | 5/1979 | Adachi et al. | 428/227 |
| 4,156,957 | 6/1979 | McKay | 28/159 |
| 4,167,600 | 9/1979 | Benzaquen | 428/91 |
| 4,190,695 | 2/1980 | Niederhauser | 428/92 |
| 4,228,123 | 10/1980 | Marshall | 264/557 |
| 4,233,349 | 11/1980 | Niederhauser | 428/92 |
| 4,251,587 | 2/1981 | Mimura et al. | 428/233 |
| 4,277,266 | 7/1981 | Dick | |
| 4,323,760 | 4/1982 | Greenway et al. | |
| 4,329,763 | 5/1982 | Alexander et al. | 28/104 |
| 4,364,156 | 12/1982 | Greenway et al. | |
| 4,368,227 | 1/1983 | Setsuie et al. | 428/91 |
| 4,379,799 | 4/1983 | Holmes | 28/104 X |
| 4,393,562 | 7/1983 | Stokes | 26/69 R |
| 4,410,579 | 10/1983 | Johns | 428/131 |
| 4,418,451 | 12/1983 | Stokes | |
| 4,426,420 | 1/1984 | Likhyani | 428/224 |
| 4,426,421 | 1/1984 | Nakamae et al. | 428/234 |
| 4,442,161 | 4/1984 | Kirayoglu et al. | 428/219 |
| 4,453,298 | 6/1984 | Nabulon et al. | 28/255 |
| 4,471,514 | 9/1984 | Stokes | |
| 4,497,095 | 2/1985 | Minemura et al. | 26/2 R |
| 4,499,637 | 2/1985 | Greenway | 26/2 R |
| 4,562,097 | 12/1985 | Walter et al. | |
| 4,578,845 | 4/1986 | Young, Jr. | |
| 4,582,666 | 4/1986 | Kenworthy et al. | 264/557 |
| 4,591,513 | 5/1986 | Suzuki et al. | 427/200 |
| 4,612,237 | 9/1986 | Frankenburg | 428/219 |
| 4,647,490 | 3/1987 | Bailey et al. | 428/131 |
| 4,665,597 | 5/1987 | Suzuki et al. | 28/104 |
| 4,691,417 | 9/1987 | Vuillaume | 28/105 |
| 4,693,922 | 9/1987 | Buyofski et al. | 28/105 X |
| 4,695,422 | 9/1987 | Curro et al. | 264/504 |
| 4,695,500 | 9/1987 | Dyer et al. | 428/134 |
| 4,718,152 | 1/1988 | Suzuki et al. | 28/104 |
| 4,743,483 | 5/1988 | Shimizu et al. | 428/89 |
| 4,767,584 | 8/1988 | Siler | 425/385 X |
| 4,805,275 | 2/1989 | Suzuki et al. | 2/89 |
| 4,808,467 | 2/1989 | Suskind et al. | 428/284 |
| 4,828,174 | 5/1989 | Love, III | |
| 4,960,630 | 10/1990 | Greenway et al. | |
| 4,967,456 | 11/1990 | Sternleib et al. | |
| 5,033,143 | 7/1991 | Love, III | |
| 5,037,692 | 8/1991 | Miyazaki et al. | 428/252 |
| 5,047,276 | 9/1991 | Chomarat et al. | |
| 5,115,544 | 5/1992 | Widen | 28/105 |
| 5,136,761 | 8/1992 | Sternleib et al. | |
| 5,142,753 | 9/1992 | Bolliand et al. | 28/167 |
| 5,173,360 | 12/1992 | Hiroe et al. | 428/229 |

FOREIGN PATENT DOCUMENTS

| | | | |
|---|---|---|---|
| 2265891 | 3/1974 | France | |
| 368145 | 6/1941 | Japan | |
| 36-8145 | 6/1961 | Japan | |
| 46-9876 | 3/1971 | Japan | |
| 54-11433 | 5/1979 | Japan | |
| 57-35051 | 2/1982 | Japan | |
| 61-6368 | 1/1986 | Japan | |
| 61-55253 | 3/1986 | Japan | |
| 61-252339 | 11/1986 | Japan | |
| 1252339 | 11/1986 | Japan | 28/163 |
| 61-58573 | 12/1986 | Japan | |
| 62-28466 | 2/1987 | Japan | |
| 62-55253 | 3/1987 | Japan | |
| 62-69866 | 3/1987 | Japan | |
| 62-149961 | 7/1987 | Japan | |
| 2149961 | 7/1987 | Japan | 28/160 |
| 63-303173 | 12/1988 | Japan | |
| 3303173 | 12/1988 | Japan | 28/160 |
| 81218 | 3/1986 | Portugal | |
| 151455 | of 0000 | United Kingdom | |
| 1015499 | 11/1963 | United Kingdom | |
| 952819 | 3/1964 | United Kingdom | |
| 978452 | 12/1964 | United Kingdom | |
| 1063252 | 3/1967 | United Kingdom | |
| 1101899 | 1/1968 | United Kingdom | |
| 1380071 | 1/1975 | United Kingdom | |
| 89/09850 | 10/1989 | WIPO | |
| 89/10441 | 11/1989 | WIPO | |

METHOD FOR HYDROPATTERNING NAPPED FABRIC

SPECIFICATION

This is a continuation of application Ser. No. 08/190,765 filed on Feb. 2, 1994, now abandoned which was a continuation of Ser. No. 07/660,753 filed on Feb. 25, 1991, now abandoned, which was a continuation-in-part of Ser. No. 07/411,491 filed on Jul. 17,1989, now U.S. Pat. No. 4,995, 151, which was a continuation-in-part of Ser. No. 07/181, 284 filed on Apr. 14, 1988, now U.S. Pat. No. 4,960,630.

FIELD OF THE INVENTION

This invention generally relates to a method and apparatus for producing a visual pattern or other patterned effect in fabric, and more particularly, for producing a pattern through treatment with water.

BACKGROUND ART

It has become desirable to impart a visual pattern or other patterned effect on some types of fabrics. For example, it is desireable to produce a washed-out, distressed, or pre-worn effect on dyed denim fabrics. Dyeing and dye printing are normally additive processes where dyes or pigments are added to natural, white, or previously dyed fabrics. Creating distressed or pre-worn surface effects is generally a subtractive process of removing color from the dyed fabric. Several subtractive, dyed fabric treatment processes are known in the art, but have been found to be unsatisfactory for various reasons. It is also desireable to produce a surface texture or pattern in a fabric which has an aesthetic visual effect, such as for rug, curtain, apparel, and other fabrics.

SUMMARY OF THE INVENTION

The present invention is directed to a method for producing a surface texture or pattern in fabric, particularly a napped fabric, using a hydropatterning apparatus and processing technique.

The hydropatterning apparatus generally includes: a conveyor for conveying a sheet of fabric through a patterning station along a machine direction, the conveyor including a support surface formed with a pattern of solid areas and void areas interspersed therein, wherein the fabric is placed flat in contact with the support surface as it is carried through the patterning station; hydrojet means disposed above the conveyor for directing a curtain of fluid downwardly to impact on the fabric as it is moved through the patterning station on the support surface, wherein said curtain of fluid is substantially continuous across the fabric and is controlled such that a visual property of the fabric become altered in correspondence to the pattern of solid areas and void areas of the support surface due to the impact of the fluid curtain on the fabric against the patterned support surface.

The hydropatterning method of the present invention encompasses the step of embossing the screen pattern into the nap of napped fabric in order to produce aesthetically pleasing surface textures and patterns in the napped fabric. The fabric, degree of nap, hydrojet pressure, processing speed, and screen patterns may be varied to obtain different surface effects and pattern retention characteristic in the napped fabric.

A further application for the present invention is the hydropatterning of fabric obtained by displacement of yarn or fiber in repeating patterns in the fabric. Light density or loosely woven fabrics are subjected to the above-described hydrojet treatment while in contact with a support surface having a pattern of raised areas, such as domes, or three-dimensionally embossed or relief-patterned woven screens. Visual effects such as ribbing, wavy lines, checkering, geometric or floral designs, or lacework can be obtained. Hydropatterned fiber displacement can be applied to dyed or undyed woven or knitted fabrics, as well as to nonwoven and stitch-bonded fabrics.

Other objects, features, and advantages of the present invention will become apparent from the following detailed description of the best mode of practising the invention when considered with reference to the drawings, as follows:

BEST MODE OF CARRYING OUT THE INVENTION

In the present invention, a hydropatterning apparatus and processing technique is used to obtain a controllable and repeatable visual pattern in fabric by the application of a non-caustic fluid under pressure to the fabric carried in contact with a patterned support surface. The hydropatterning technique can also be used to obtain a subtractive, color washout effect in dyed woven fabrics, such as in warp dyed denim with indigo dyestuff, and fiber displacement patterns in light density or loosely woven fabrics. The processing technique may employ other non-caustic fluids besides water, and may be used with other types of fabrics, including nonwoven fabrics.

Figure 1:
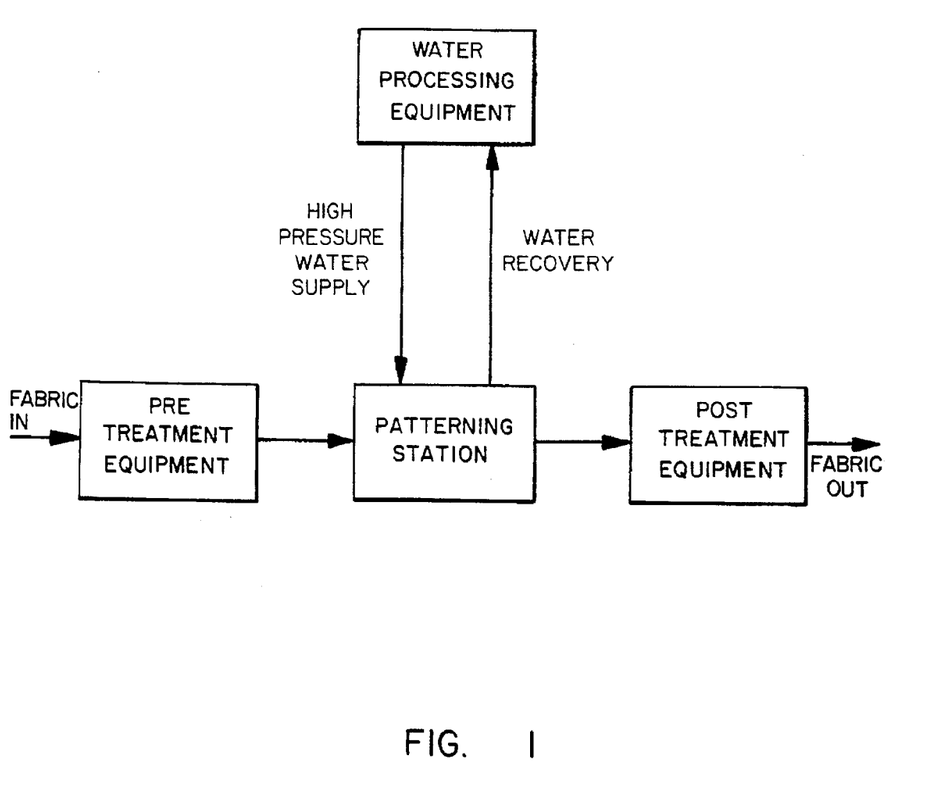
FIG. 1 is a schematic diagram of the process steps for hydropatterning fabric in accordance with the invention.

Referring to the general hydropatterning process as illustrated in FIG. 1, incoming fabric is subjected to any required pre-treatment, such as dyeing with dyestuff to obtain a base color level. The pre-treated fabric is then subjected to the hydropatterning treatment of the invention at a patterning station, which receives a supply of high pressure water from and returns recovered water to the associated water processing equipment. The patterned fabric from the patterning station is then subjected to any required post-treatment, such as drying under tension on conventional tenter frames, to obtain the final fabric product.

Figure 2:
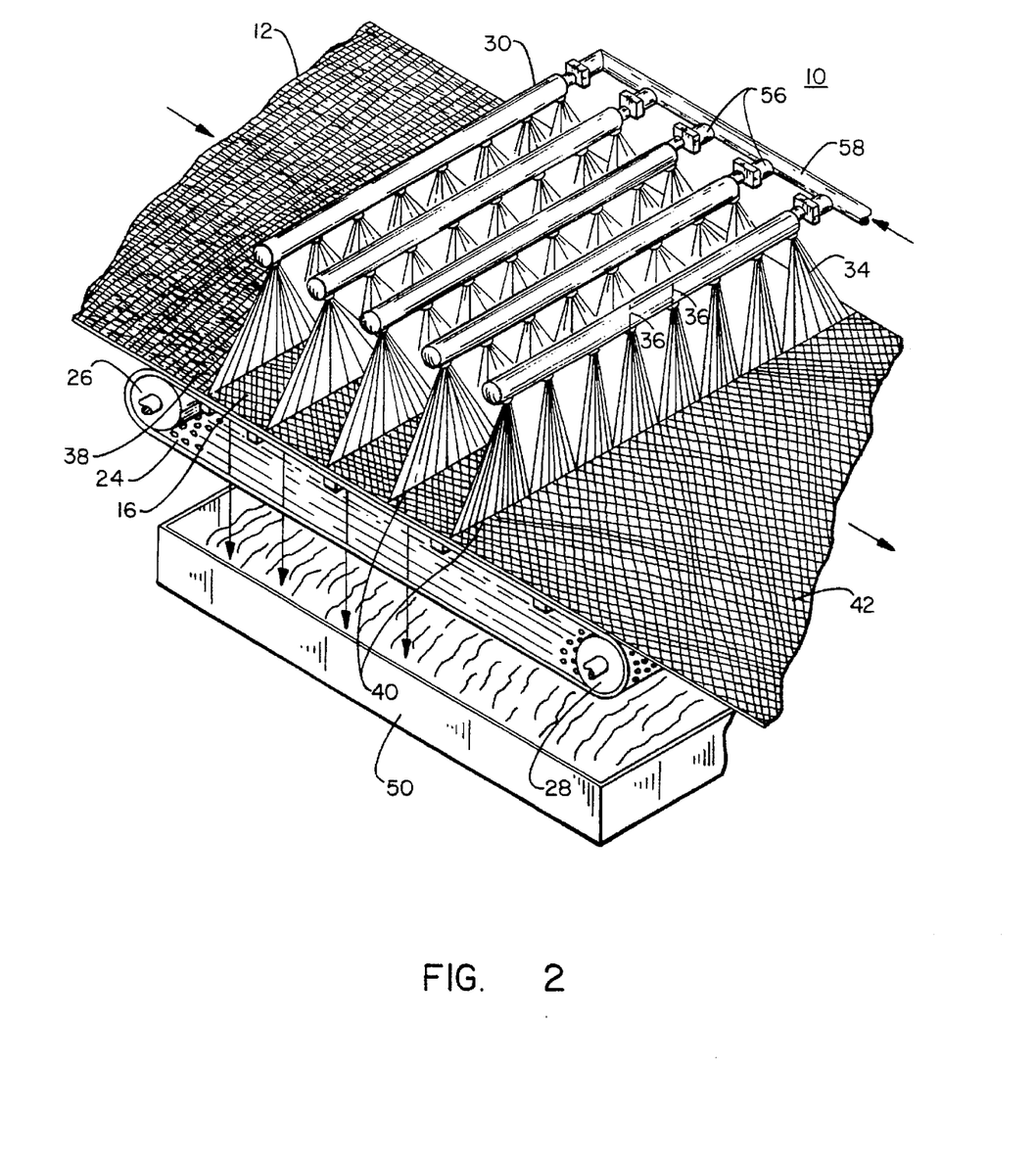
FIG. 2 is a perspective view illustrating one embodiment of hydropatterning apparatus for carrying out the invention.

Referring now to one preferred form of hydropatterning apparatus shown in FIG. 2, the patterning station 10 includes an endless conveyor 24 driven by rollers 26, 28 for advancing the fabric 12 in a machine direction (arrow indicating a downstream direction). Preferred line speeds for the conveyor are in the range of 10 to 500 ft/min. The conveyor 24 presents a generally planar support surface 16 in the patterning zone which is formed with a plain weave pattern of solid (or raised) and void (or lowered) areas, e.g. grid, honeycomb, diamond, striated, etc. The fabric is supported in contact with the solid or raised areas of the pattern, while the void areas drain away the water applied to the fabric, as described further below. In the preferred embodiments, the void areas occupy approximately 25 percent of the overall pattern area. The fabric 12 in FIG. 2 has a different cross-hatching at the exit end 42 from the incoming fabric at the entry end 38 to indicate that it has been altered by the hydropatterning process.

Mounted above the conveyor 24 is an arrangement of manifolds 30 spaced apart in parallel and aligned in a cross direction of the fabric which is perpendicular to the machine direction. The manifolds 30 are spaced approximately 4 inches apart, and are positioned at least 1.0 inch, and preferably in the range of 1 to 10 inches above the conveyor. Each manifold has a row of water jet nozzles 36, spaced along the cross direction, which ejects a divergent fan jet 34 of water downwardly on the fabric 12. The fan jets 34 overlap to form a continuous curtain 40 of water which impacts substantially evenly across the width of the fabric. This produces an even pressure of water on the fabric against the patterned support surface in order to avoid streaking or otherwise uneven patterning.

The manifolds are designed to deliver fluid pressures to the nozzles 36 in the range of 200 to 2500 psi. The nozzles of the manifold are spaced approximately 1 inch apart and are positioned 1 to 10 inches above the conveyor 24. The fan jets 34 diverge in a fan-shape having an angle of divergence in the cross direction relative to the nozzle axis which is perpendicular to the conveyor surface. The angle of divergence may be from 2 to 45 degrees, and experimentation has shown that a divergence angle of about 18 degrees yields an optimum fan shape and an even curtain of water pressure. The output energy of the curtain of water is preferably in the range of 0.4 to 2.0 hp-hr/sq-yd of fabric, and particularly 1.0 hp-hr/sq-yd. In the case of heavier fabrics such as denim, the energy applied to the surface of the fabric may be a surface effect and therefore independent of weight.

Preferred nozzles for use in the invention are of the type manufactured by Spraying Systems Co., distributed by J. W. Snowden & Associates, Manchester, N.H., under product designation 0503-TC. This nozzle has a tungsten carbide spray tip which has been found effective for providing regulated pressure sprays. The ejection orifices in the nozzle have a non-circular shaped configuration. The preferred nozzle has an effective diameter of about 0.43 inches and flow rate of 1.5 gallons/min with an effective jet spray angle of approximately 18 degrees and 1000 psi.

Figure 3:
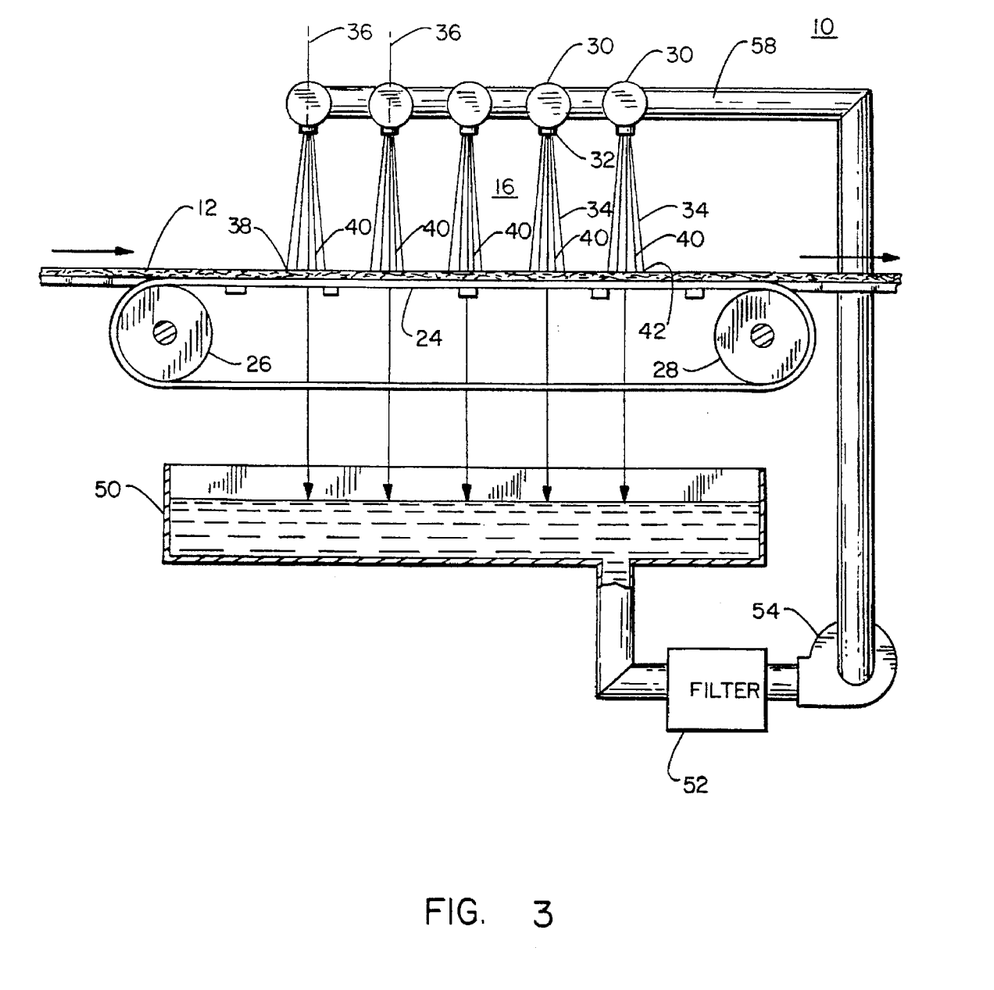
FIG. 3 is a side schematic view of the hydropatterning apparatus illustrated in FIG. 2.

As shown in FIG. 3, as the fabric is moved on the conveyor 24 through the series of water curtains 40, the water impacts on the fabric against the raised or solid areas of the patterned support surface. It is found that a dye which lacks a certain degree of color fastness, such as indigo dye, will wash out from the fabric in the raised or solid areas at least partially under the pressure of the water curtains. The water and carried-away dye is drained through the void areas of the support surface to a collecting tank 50 below the conveyor 24. A filter 52 is provided to remove dislodged fibers and other debris, and a recirculating pump 54 returns the water under pressure to the manifolds 30. The washed out dye may be removed by the use of settling tanks.

Figure 4:
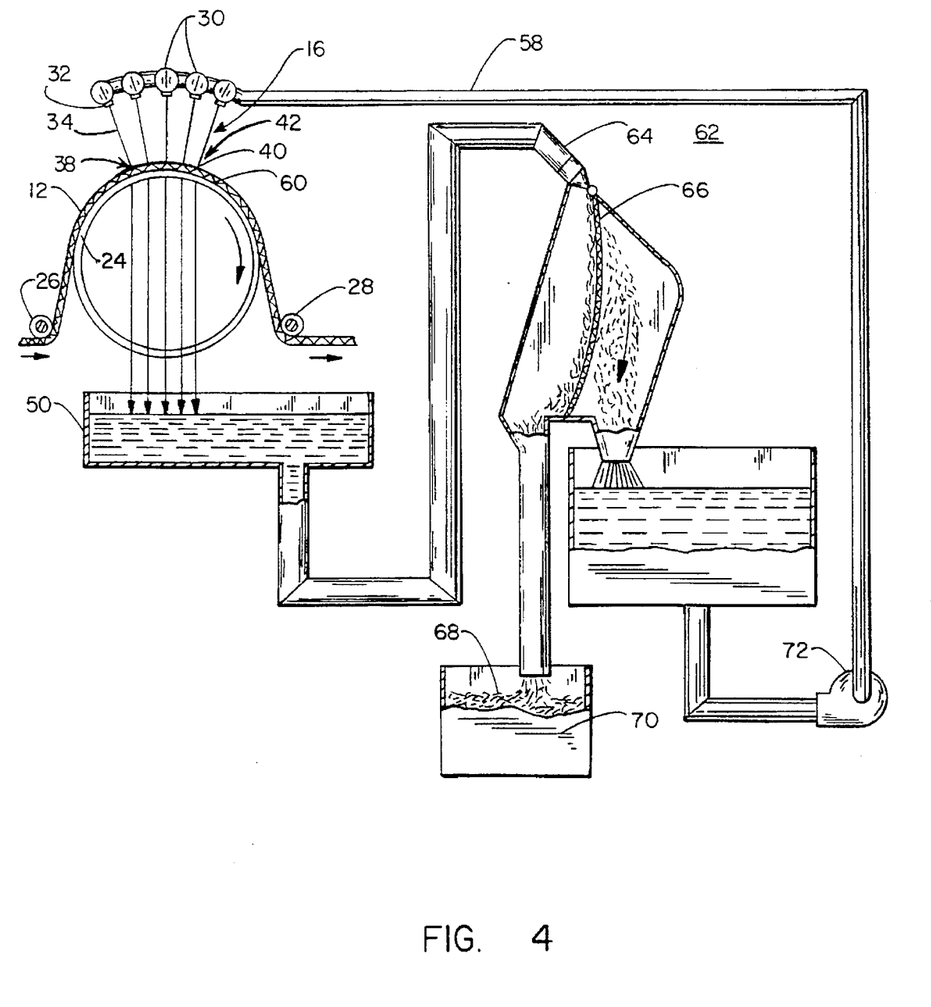
FIG. 4 is a side schematic view of another embodiment of the hydropatterning apparatus.

A preferred conveyor structure is shown in FIG. 4 employing a cylindrical or drum conveyor 24 and patterned support surface 60. The manifolds 30 are arranged in close proximity at the upper part of the circumference of the support member. In its other aspects, the operation of this embodiment is similar to the first described embodiment, although the drum conveyor is found to provide preferred results. The water processing equipment in this embodiment includes a filtration system of the type manufactured by Dore Oliver Inc., Stamford, Conn., under product designation 120 DSM Screen. The DSM system has a dispensing nozzle 64 and filter screen 66 which directs fiber debris into discharge receptacle 70, while the filtered fluid is diverted to be recirculated through pump 72. A settling tank is used for dyestuff recovery, although it is not shown in the drawing.

Figure 5A:
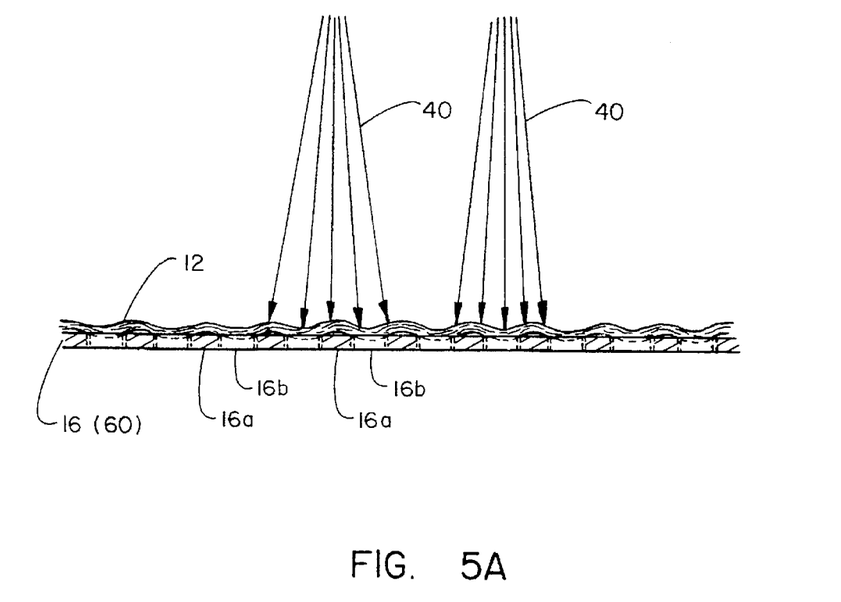
FIG. 5A is a sectional view showing a planar support surface for hydropatterning fabric which has a pattern of void and solid areas suitable for color washout effects.

In FIG. 5A, a side sectional view illustrates the washout patterning function of the water curtains 40 impacting downward on the fabric 12 carried on the support surface 16 (60). The support surface has a pattern of solid areas 16a and void areas 16b, such as may be produced by a honeycomb or evenly perforated pattern in a screen. The pressure of the water jets presses the fabric 12 against the support surface so that portions of it are supported on the solid areas 16a and other portions are depressed into the void areas 16b. It is found that, for a dyed fabric, the dye tends to wash out from the raised portions supported on the solid areas 16a, and to drain into and to be retained in the depressed portions in the void areas 16b, thereby producing a color washout pattern corresponding to the pattern of the support surface.

Figure 6A:
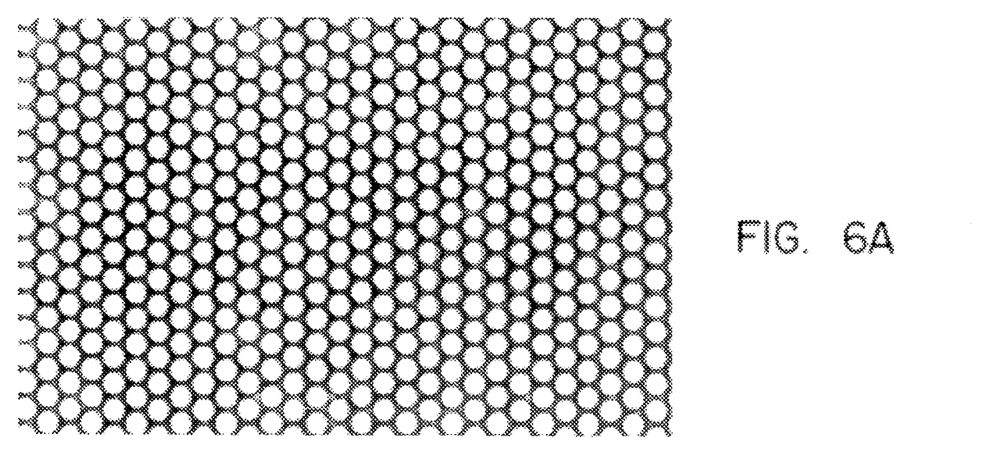
FIGS. 6A to 6K are photographs of support surface patterns and the resulting dye washout effects obtained in the fabric in accordance with the invention.
Figure 6B:
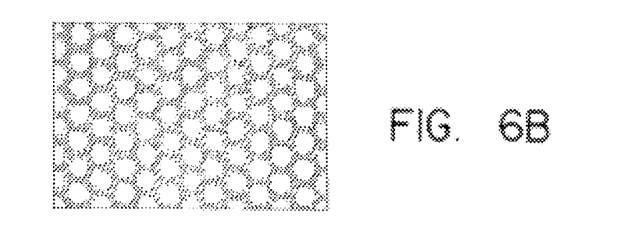
Figure 6C:
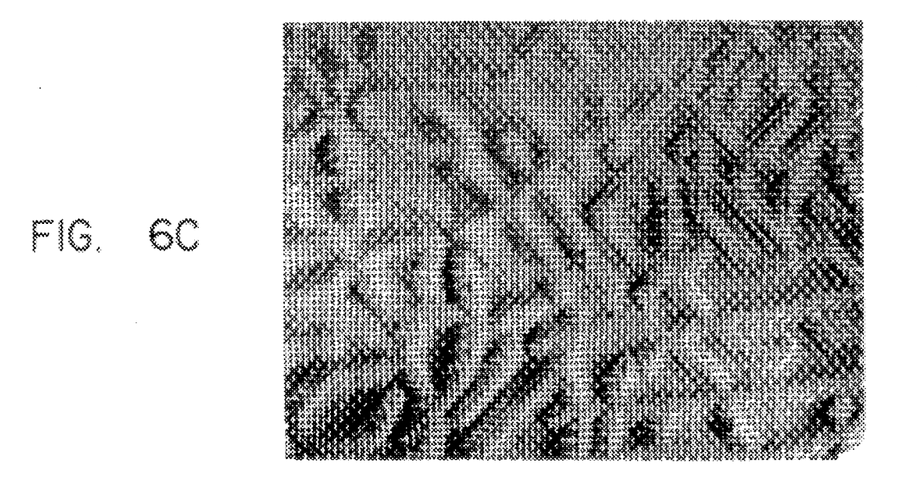
Figure 6D:
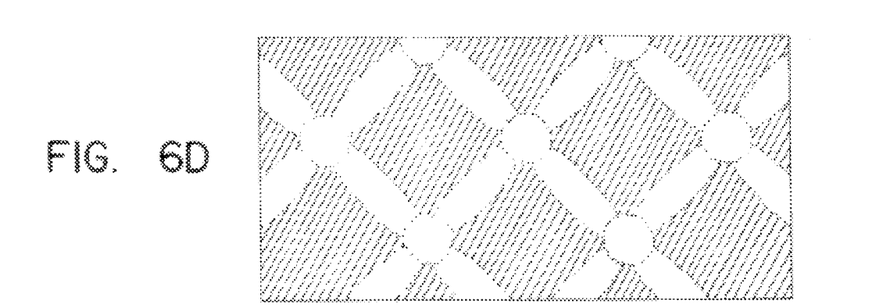
Figure 6E:
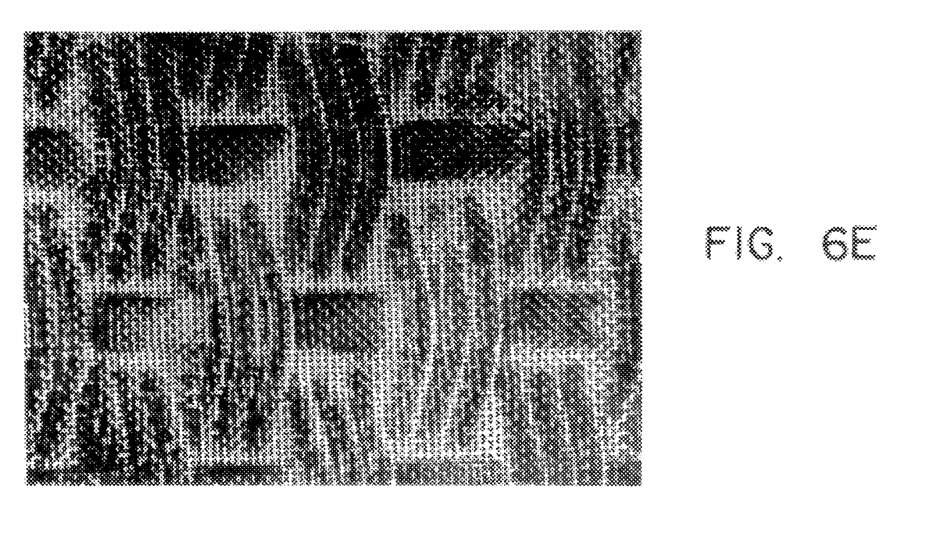
Figure 6F:
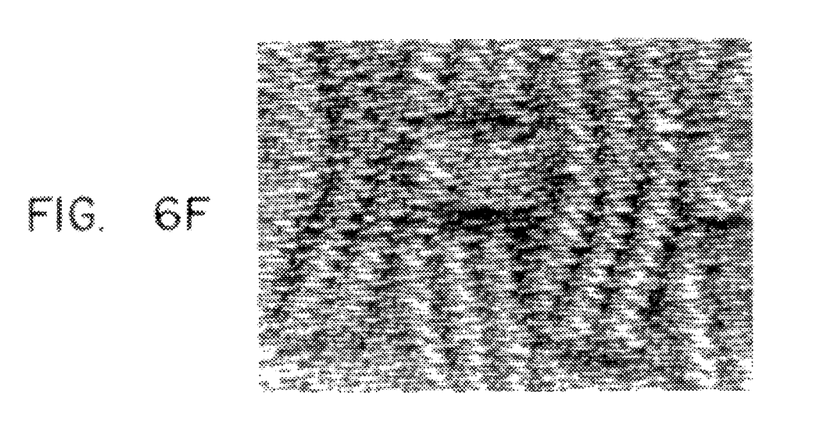
Figure 6G:
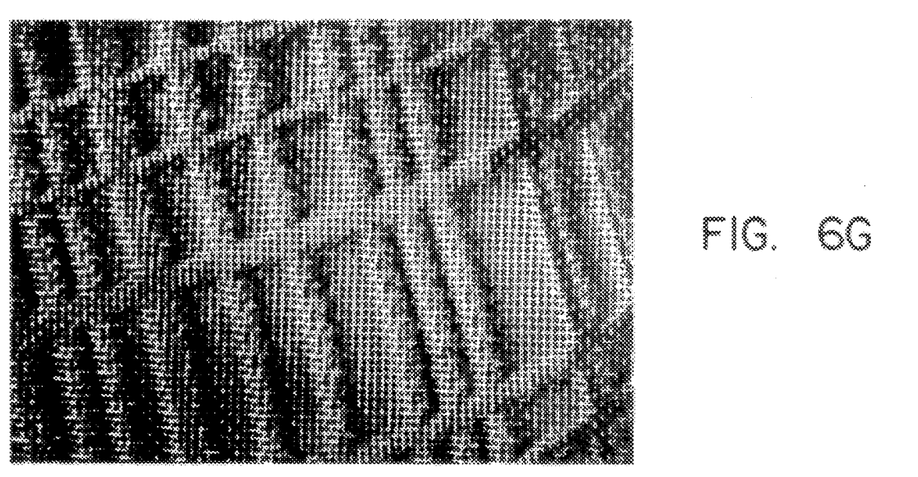
Figure 6H:
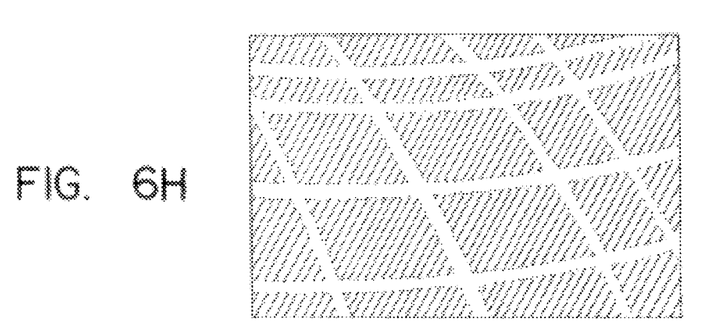
Figure 6I:
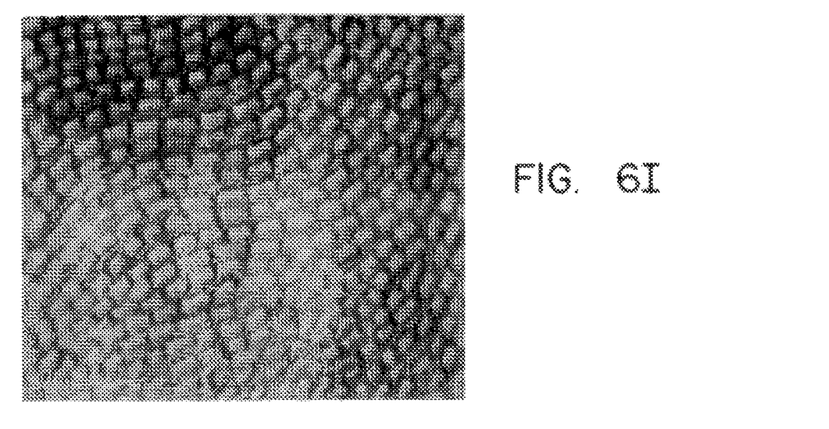
Figure 6J:
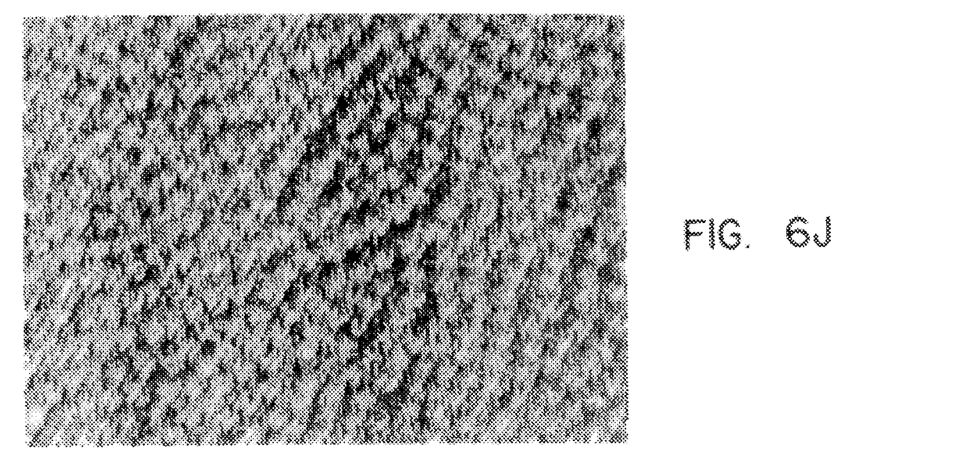
Figure 6K:
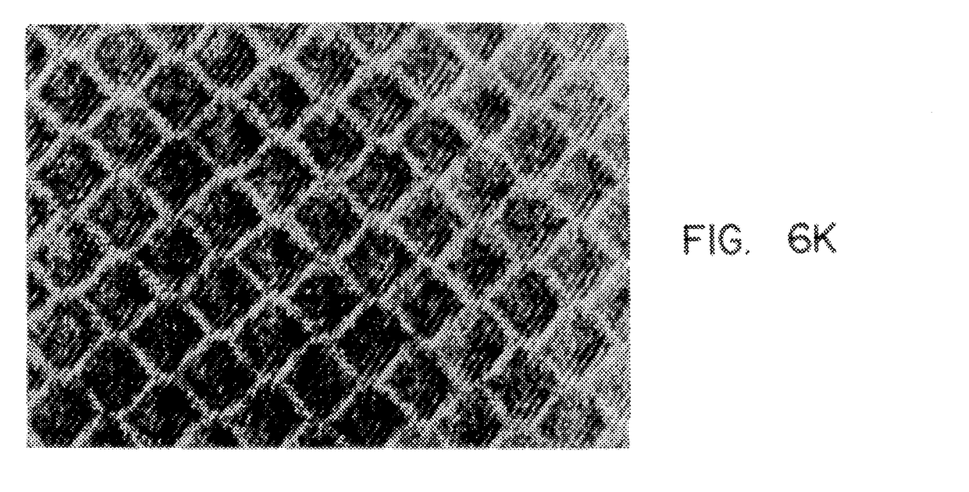

In FIGS. 6A to 6K, examples of several patterned support surfaces and the resulting pattern effect obtained on the fabric are shown. Generally, the support surface is formed out of fine wire mesh in which raised areas are formed in a repeating pattern, or from a metal plate in which void areas are perforated. In FIG. 6A the support surface was a perforated metal plate with round void areas, and the resulting fabric is shown in FIG. 6B having a stippled washout effect. The support surface in FIG. 6C is a wire mesh embossed with a repeating flower pattern, and the resulting patterned fabric is shown in FIG. 6D. The wire mesh employed a basket weave embossing in FIG. 6E, with the result in FIG. 6F, a plaid embossing in FIG. 6G, with the result in FIG. 6H, a lines/dots embossing in FIG. 6I, with the result in FIG. 6J. The patterned result of a wire mesh drum embossed with a honeycomb pattern is shown in FIG. 6K.

Besides retaining the washout pattern, the resulting fabrics can also retain a three-dimensional embossed effect corresponding to the pattern of the support surface due to the pressure of the water at the hydropatterning station forcing the fabric into the open areas of the screen or plate. The patterned fabrics may be treated with sizing or other stiffeners or heat setting to make the embossed effect more permanent. The embossed effect can be obtained alone, without the washout effect, by using dyestuff which is more color fast than indigo or other vat dyes.

Figure 5B:
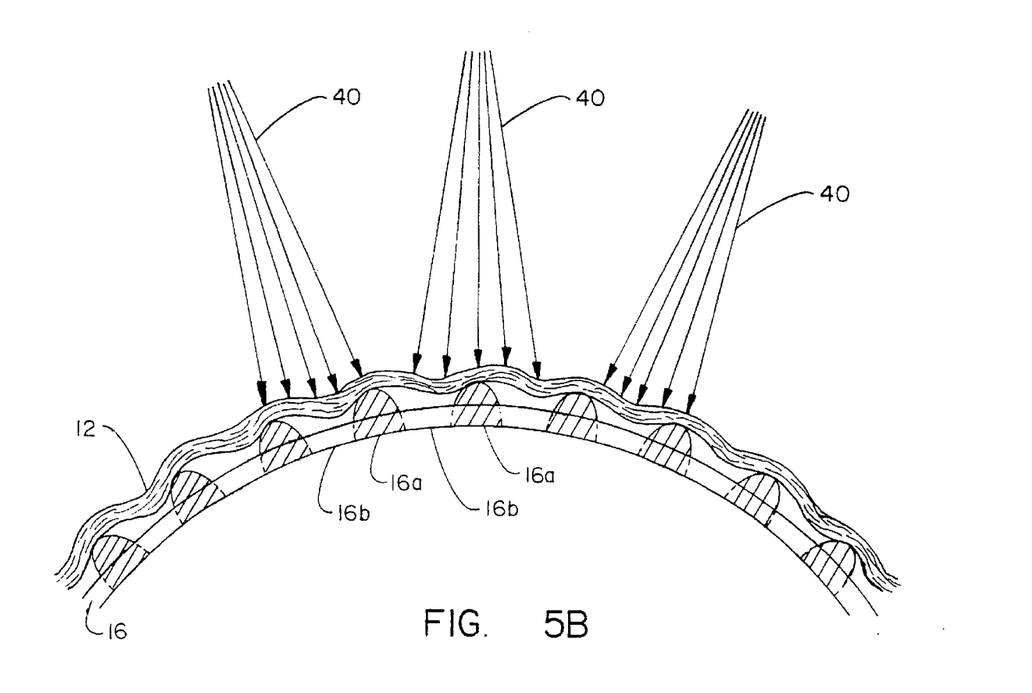
FIG. 5B is a sectional view of a drum support surface which has a pattern of domes and depressed areas suitable for fiber displacement effects.

In FIG. 5B, a side sectional view illustrates the fiber displacement patterning function of the water curtains 40 impacting downward on the fabric 12 carried on the drum support surface 16 (60). The drum support surface has a three-dimensionally embossed or woven relief pattern of raised or embossed areas 16a, such as in the shape of domes, and void areas 16b. The pressure of the water jets presses the fabric 12 against the support surface so that portions of it are forced against the domed areas 16a and other portions are depressed into the lowered or void areas 16b. The drum support surface is preferred for both color washout and fiber displacement effects. It is found that, for light density or loosely woven fabrics, the fibers are displaced by the action of the water and become entangled together at crossover points. The yarns are thus locked together, creating open areas or lace-like fabric with good cohesion and stability. The fabric also exhibits good drape and hand, because it is such an open fabric, yet has limited yarn slippage due to the locking together of the fibers during hydropatterning. The patterning is most effective in lightweight fabrics with fine to moderate size yarns. Such patterns can include ribbing, wavy lines, checkering, geometric or floral designs, or lacework effects. The use of higher energy water curtains or treating the patterned fabrics with sizing can make the displacement effect more permanent.

Figure 7A:
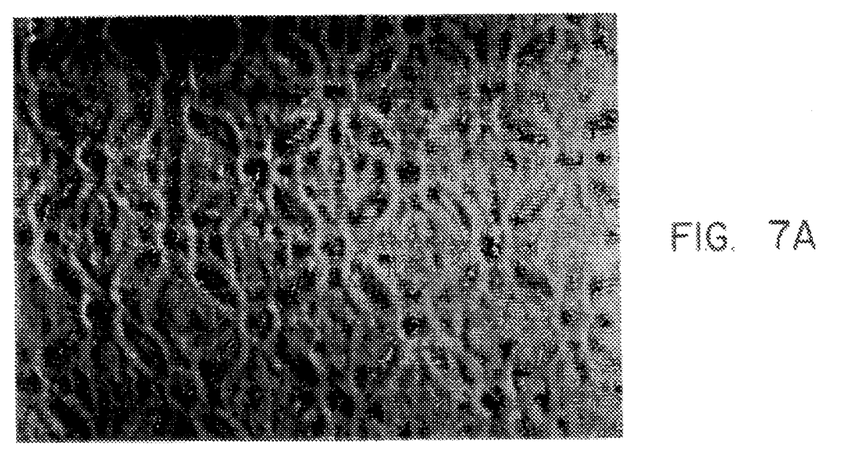
FIGS. 7A to 7L are photographs of support surface patterns and the resulting fiber displacement effects obtained in the fabric.
Figure 7B:
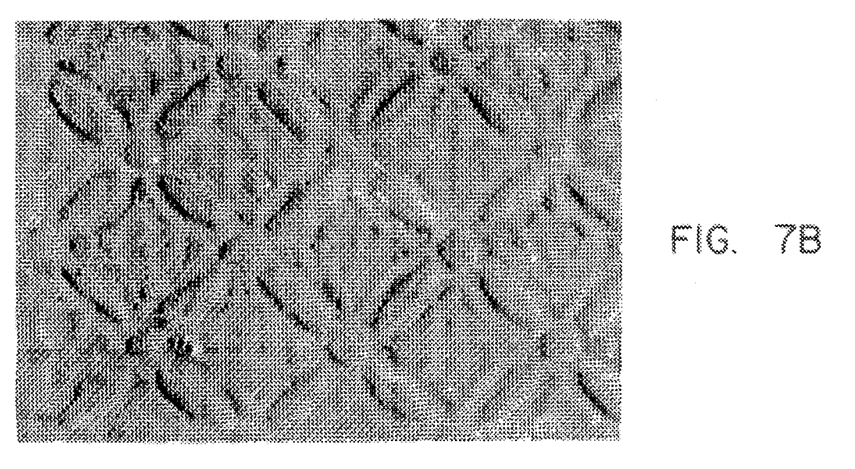
Figure 7C:
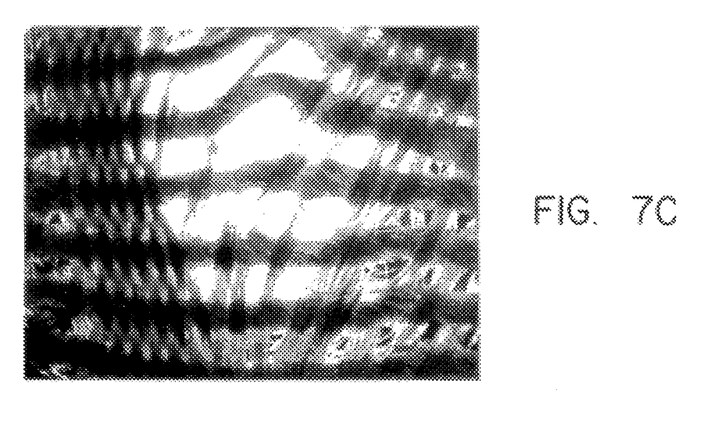
Figure 7D:
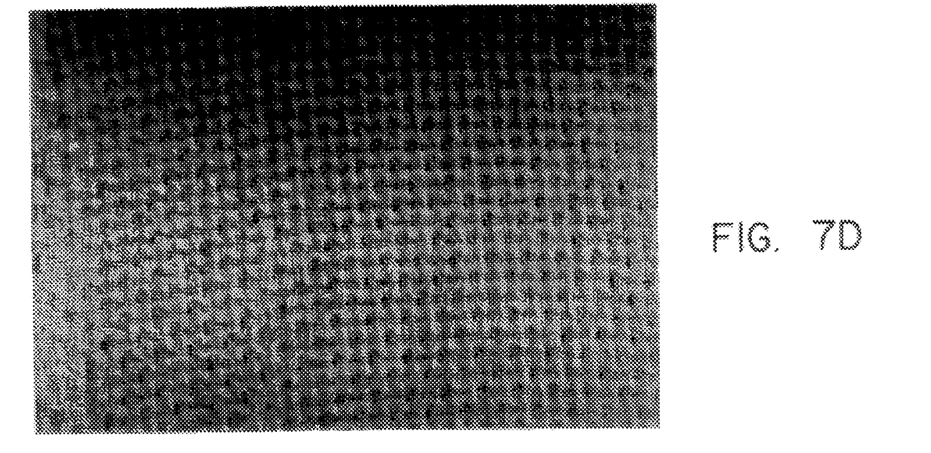
Figure 7E:
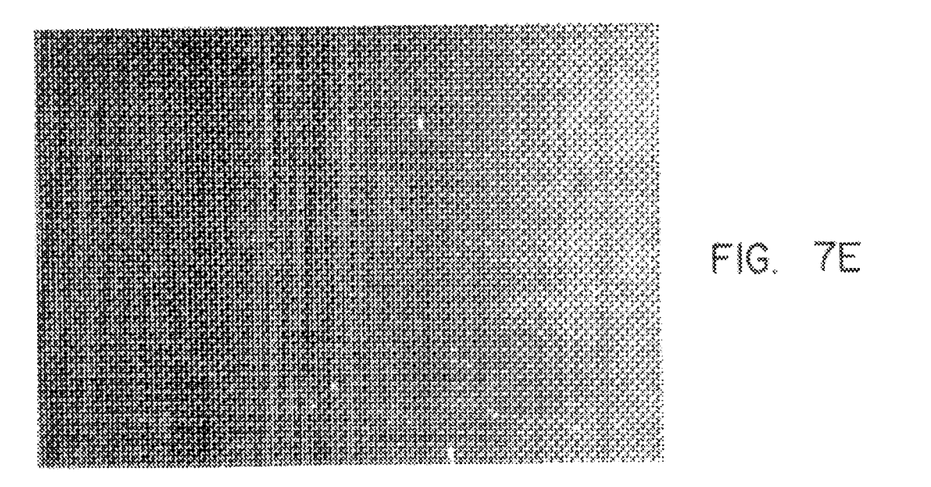
Figure 7F:
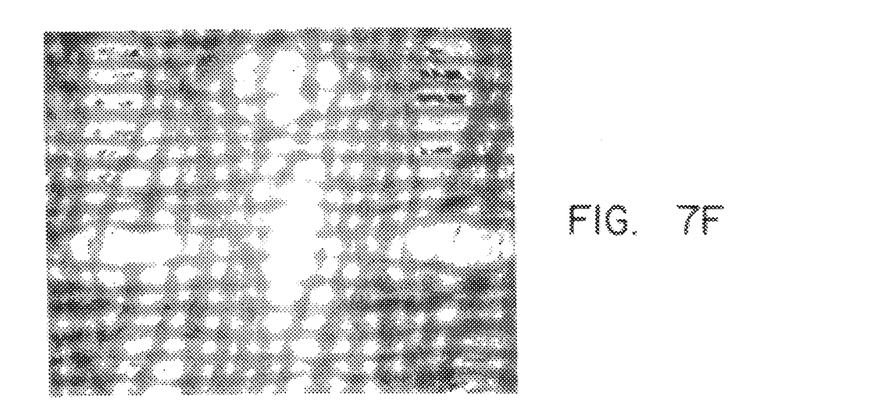
Figure 7G:
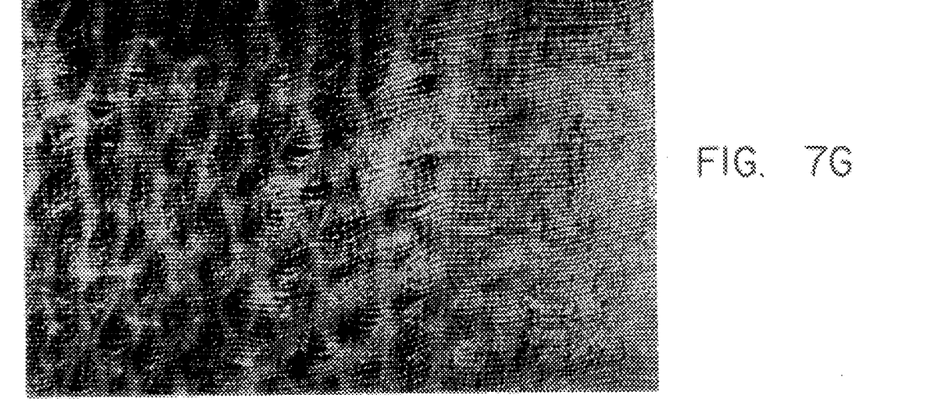
Figure 7H:
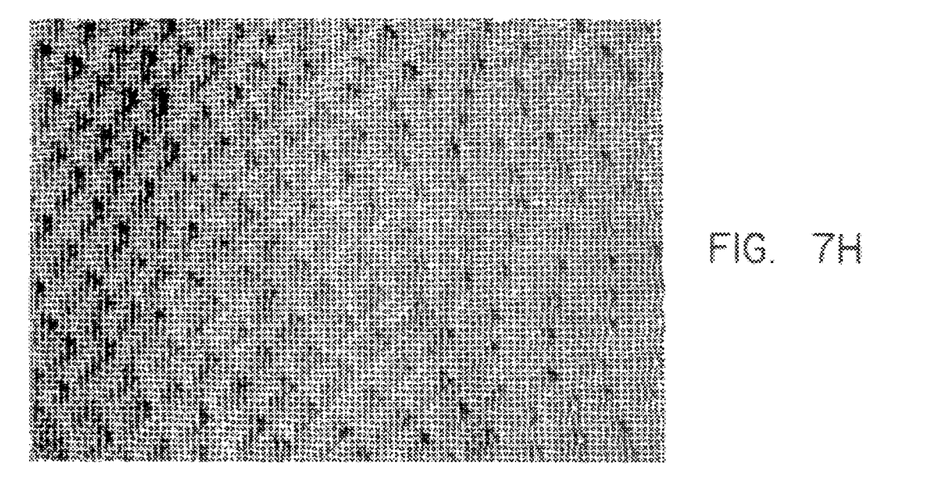
Figure 7I:
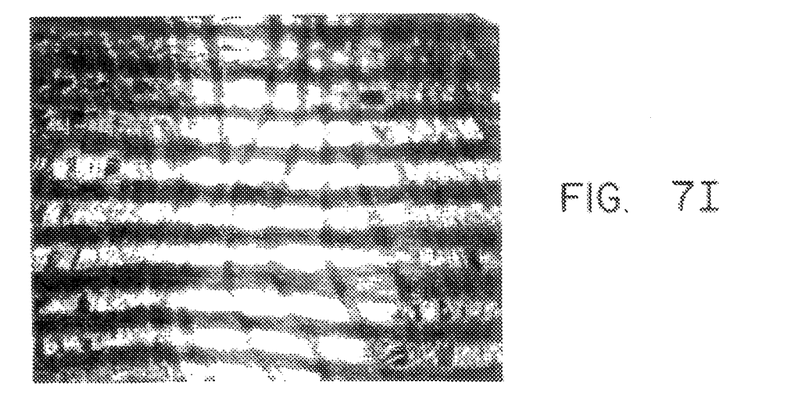
Figure 7J:
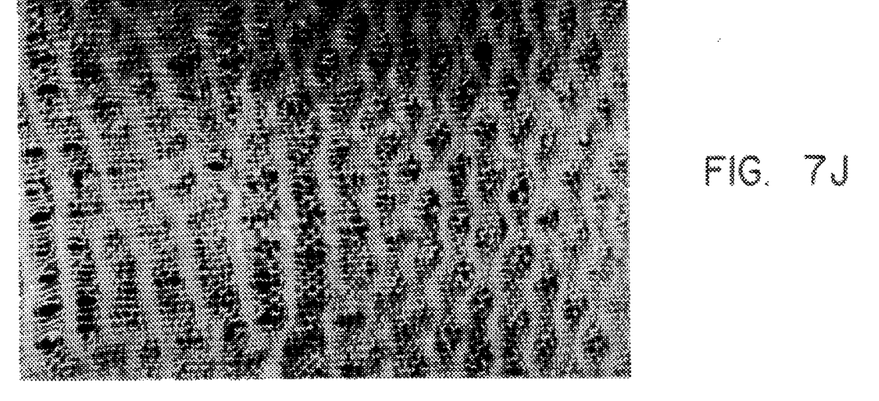
Figure 7K:
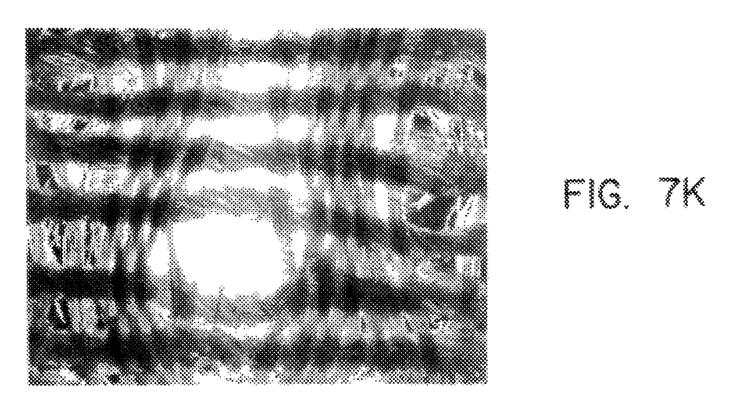
Figure 7L:
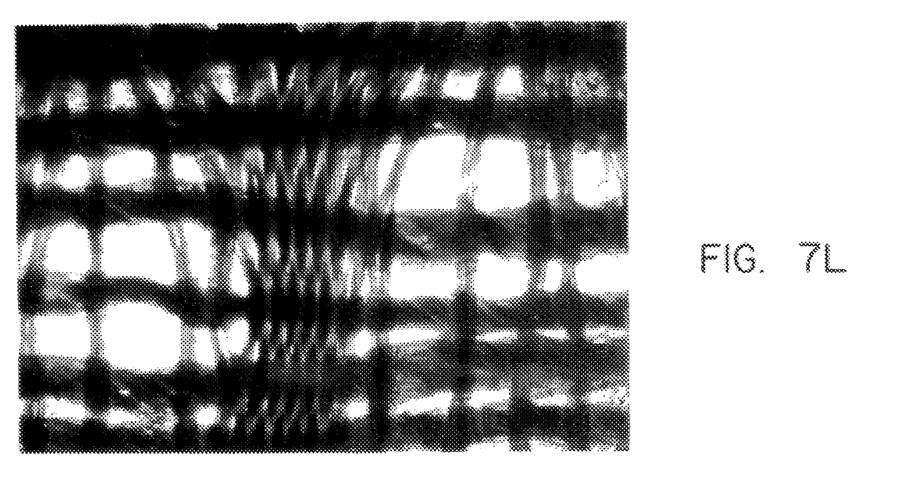

FIGS. 7A to 7L show samples of the displacement patterns obtained in fabrics with different patterned screens. In FIG. 7A, a blouse fabric made of polyester/rayon, having filament warp yarns of 76 ends/inch in the warp (machine) direction, and spun fill of 31 picks/inch in the cross direction, is patterned using the flower patterned screen shown in FIG. 7B. The photomicrograph of FIG. 7C shows a magnified view (16×) of the yarn displacement obtained. In FIG. 7D, a shirt fabric of 100% cotton, of 76 ends/inch by 68 picks/inch, is patterned using the woven mesh (20×20/inch) screen shown in FIG. 7E, with the displacement result shown magnified (16×) in FIG. 7F. In FIG. 7G, a seeded batiste fabric, composed of 92% polyester and 8% cotton fibers, of 90 ends/inch by 44 picks/inch, is obtained using the wavy lines/dots screen shown in FIG. 7H, with the displacement result shown magnified (16×) in FIG. 7I. FIG. 7J further shows the blouse fabric patterned with the wavy lines/dots screen of FIG. 7H, with the fiber displacement result shown magnified (16×) in FIG. 7K and (18×) in FIG. 7L.

Thus, the hydropatterning process employs one or more water curtains under pressure against a patterned screen to produce a surface texture or pattern that can be regularly repeated in the fabric and controlled for the desired effect. A wide range of patterned designs and visual effects can be obtained. The hydropatterning technique produces minimal wear and tear on the process equipment and on the fabric being processed. Furthermore, the production of caustic or chemical wastes is minimized, thereby lessening the impact of such fabric treatment processes on the environment.

A principal feature of the present invention is the use of the hydropatterning technique to emboss the screen pattern into the nap of napped fabric. By processing a heavily napped fabric with the napped side against the patterned screen, and applying the continuous curtain of water against the opposite side of the fabric, aesthetically pleasing surface textures and patterns can be produced in the napped fabric. It is found that a profound impression in the napped surface can be obtained with only one pass under four manifolds at 1500 psi. and conveyor speed of 100 ft/min. Higher speeds, of the order of 300 ft/min. could be used. A light nap pattern impressed on both sides of proper fabrics can obtain a substantial enhancement in resistance to edge fray. Fur-like surface textures similar to Persian lamb can be obtained using a correspondingly designed patterning screen. The fabric construction, degree of nap, hydrojet pressure, processing speed, and screen patterns may be varied to obtain different surface effects and pattern retention characteristics in the napped fabric.

A wide range of other patterning effects can be achieved by using different dyes, colors, dyeing processes, water curtain configurations, screen patterns, fabrics, and fabric weaves. The water curtain can be generated by other types and arrangements of nozzles and pressure manifolds. Woven, perforated, or expanded metal or plastic screens or other three-dimensional screens with raised and lowered areas can be used for the support surface to achieve the patterned effect. The hydrojet processing of the fabric can also employ additives, such as caustic agents and abrasives, if desired, and other types of fluids. Besides woven fabrics, other nonwoven, bonded, layered, gauze, or composite fabrics or laminates may be similarly hydropatterned in accordance with the principles of the invention.

Other modes of hydro-processing of fabrics may be devised in accordance with the principles of the invention disclosed herein. For example, columnar jets, offset manifolds, and other water curtain arrangements might be used with three-dimensional and other patterned support surfaces or with patterned stencils to obtain patterned visual effects in fabrics. A related example of hydroprocessing is PCT Application No. US/89/01593, filed on Apr. 13, 1989, by Veratec Corporation, entitled "Apparatus and Method For Hydroenhancing Fabric Properties", disclosing the use of hydroprocessing of fabric to improve fabric properties such as uniformity of yarn distribution, enhanced bloom, wear-resistance, anti-cupping, and anti-torquing. Additions or modifications to the basic hydro-processing line might also be used, for example, incorporating mechanical brushing or abrading, chemical additives, and post-treatment processing such as bonding, binder padding, finish treatments, stiffening, etc.

Other variations of structures, materials, products, and processes may of course be devised. All such variations, additions, and modifications are nevertheless considered to be within the spirit and scope of the present invention, as defined in the claims appended hereto.

We claim:

1. A method for hydropatterning a pattern in a fabric comprising the steps of:

conveying a sheet of fabric in a machine direction supported on a support surface which is formed with a pattern of raised or solid areas and lowered or void areas interspersed therein, and directing a curtain of fluid from a fluid jetting source downwardly to impact on the fabric as it is conveyed on the patterned support surface, wherein said fabric is a napped fabric comprising fibers bonded or woven into a mat with loose ends of the fibers forming a napped side of said fabric, said napped side being placed in contact against the patterned support surface with an opposite side of said fabric facing away from the patterned support surface toward the fluid jetting source, and said directing step includes directing said fluid curtain against the opposite side of the fabric facing toward the fluid jetting source such that a visual or physical property of the napped side of the fabric in contact with the patterned support surface becomes altered in correspondence to the pattern of raised or solid areas and lowered or void areas of the support surface due to the impact of the curtain of fluid on the fabric against the support surface.

2. A method for hydropatterning napped fabric according to claim 1, wherein the fluid directing step includes providing a manifold extending in a cross direction perpendicular to the machine direction having a plurality of nozzles spaced in the cross direction which eject divergent, overlapping jets of water so that the resulting water curtain impacts substantially evenly across the fabric.

3. A method for hydropatterning fabric according to claim 1, wherein the fluid directing step includes providing a plurality of manifolds arranged in parallel and spaced apart in the machine direction over the fabric.

4. A product produced by the method according to claim 1, wherein the napped side of the fabric is hydropatterned to have a desired physical property of fur.

* * * * *

UNITED STATES PATENT AND TRADEMARK OFFICE
CERTIFICATE OF CORRECTION

PATENT NO. : 5,632,072
DATED : May 27, 1997
INVENTOR(S) : Arlene T. Simon et al.

It is certified that error appears in the above-indentified patent and that said Letters Patent is hereby corrected as shown below:

On the Title page, item [63]:

In the "FOREIGN PATENT DOCUMENTS", change "151455 of 0000 United Kingdom" to --1515455 of 0000 United Kingdom--.

Signed and Sealed this

Twentieth Day of January, 1998

Attest:

BRUCE LEHMAN

Attesting Officer

Commissioner of Patents and Trademarks